United States Patent [19]

Panos

[11] Patent Number: 4,901,948
[45] Date of Patent: Feb. 20, 1990

[54] CONTROL SYSTEM FOR JET PROPELLED VEHICLE

[76] Inventor: Peter M. Panos, 10692 Meads Ave., Orange, Calif. 92669

[21] Appl. No.: 267,324

[22] Filed: Nov. 4, 1988

[51] Int. Cl.⁴ .................. B64C 15/02; B64C 39/06
[52] U.S. Cl. .................................. 244/23 C; 244/52
[58] Field of Search .......... 244/52, 51, 23 C, 23 D, 244/237, 12.2

[56] References Cited

U.S. PATENT DOCUMENTS

| | | | |
|---|---|---|---|
| 1,471,764 | 10/1923 | Wheeler | 244/52 |
| 1,822,082 | 9/1931 | Davis | 244/237 |
| 2,870,978 | 1/1959 | Griffith et al. | 244/23 D |
| 3,020,003 | 2/1962 | Frost et al. | 244/23 C |
| 3,190,584 | 6/1965 | Gire et al. | 244/52 |
| 3,442,469 | 5/1969 | Davis | 244/23 C |
| 4,023,751 | 5/1977 | Richard | 244/23 C |
| 4,433,819 | 2/1984 | Carrington | 244/52 |

Primary Examiner—Galen Barefoot
Attorney, Agent, or Firm—Harlan P. Huebner

[57] ABSTRACT

A vehicle capable of omnidirectional movement employing a jet engine and a plurality of directional jet nozzles communicating with said engine, and a single controller means united with said nozzles to cause omnidirectional movement of said vehicle and control the acceleration and deceleration of said vehicle.

10 Claims, 3 Drawing Sheets

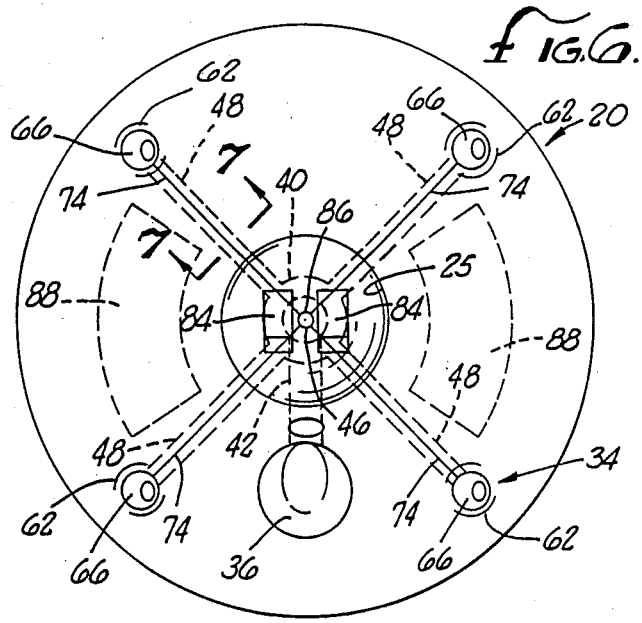
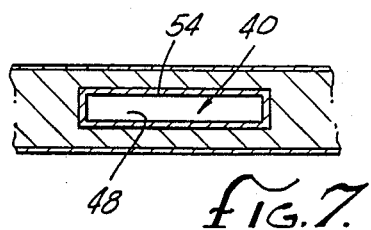
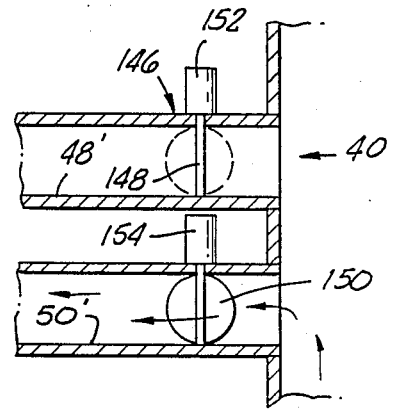
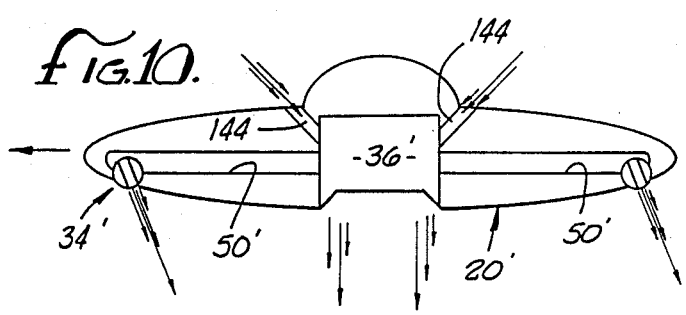
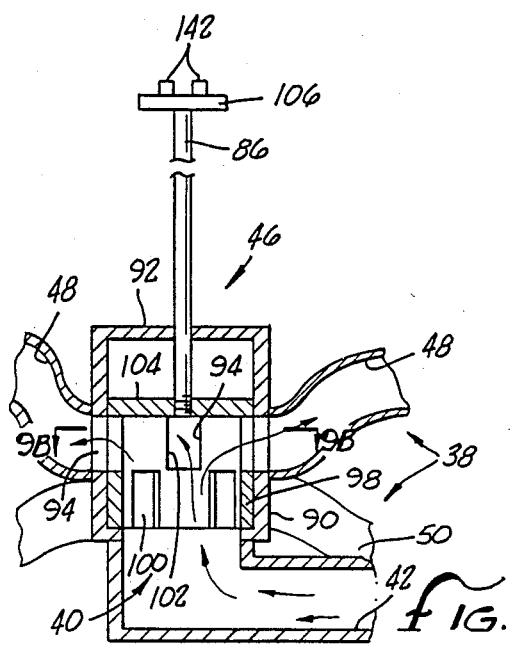
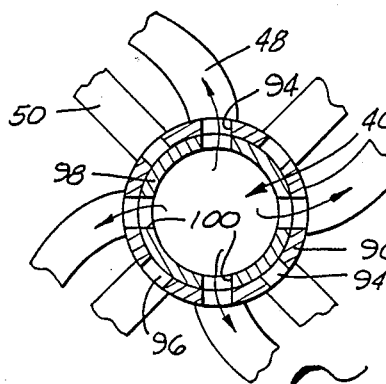

CONTROL SYSTEM FOR JET PROPELLED VEHICLE

BACKGROUND OF THE INVENTION

1. Field of the Invention

This invention relates to a control system for imparting omnidirectional movement to a jet vehicle.

2. Description of the Prior Art

With the advent of Vertical Take Off and Landing (VTOL) aircraft, Vertical/Short Take Off and Landing (V/STOL) aircraft and hover craft utilizing jet propulsion the necessity of establishing controls to accomplish directional movement, power thrust and related activities the pilot or operator is burdened with an inordinate number of feet and hand activities including other monitoring and vehicle control functions.

There have been various attempts to develop simplified single hand control means to control the attitude of a vehicle moving or directing movement through a fluid medium wherein the pilot or operator can maintain a freedom of other limbs for other critical functions of the vehicle.

One such control means is setforth in U.S. Pat. No. 3,350,956 ('956) which is directed to a single handle that includes a hand operated device to control rotational movement about three axes and translational movement along the same three axes. The disadvantage of the '956 patent is that there are three frames within one another to translate the handle movement. Such control is cumbersome particularly with the plurality of gimbals necessary to accomplish the movement.

In U.S. Pat. No. 4,023,751 a plurality of jet nozzles are illustrated wherein one is tied to the next by tie rods requiring a number of connections when there are a number of jet nozzle which can easily malfunction causing no simultaneous movement.

U.S. Pat. No. 3,442,469 discloses a selsyn control system which again has limited use and the nozzles are fixed and not directionally controlled.

Other prior art, U.S. Pat. No. 2,939,654 discloses a single lever and a form of nozzle control, however, the nozzles are to receive air not exhaust and further the control does not include acceleration control means for the jet ducts. U.S. Pat. No. 3,051,417 while illustrating a single control arm only utilizes the same to control the discharge of gas from peripheral discharge members and not the adjustment of nozzles.

SUMMARY OF THE INVENTION

It is a purpose of this invention to provide a control system for a jet vehicle to allow omnidirectional movement of the vehicle through single control means.

It is another object of the present invention to provide a control system which will simultaneously rotate a series of jet nozzles spaced in a vehicle to a desired angle for causing omnidirectional movement of the vehicle.

A still further object of the present invention is to provide a control system wherein only one flight controller is necessary to be manipulated to achieve desired direction of multiple jet nozzles on a vehicle as well as the volume of exhaust passing to any of said multiple jet nozzles.

Another object of the present invention is to provide swivel mounted jet nozzles that are connected by linking means to a single flight controller for accomplishing vertical lift and descent of the vehicle as well as forward, rearward and side movement thereof.

A further object of the present invention is to provide jet thrust control means in a single flight controller system to act with the jet nozzle directional movement to assist in causing movement of said vehicle.

A still further object of the present invention is to provide a vehicle which is saucer shaped with a central pilot containing section, a jet engine having directional nozzles interposed therein around the saucer and single controller means to impart omnidirectional movement to said saucer vehicle.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 6 is a top view of a saucer shaped vehicle with control means emanating from a common source to a plurality of nozzles;

FIG. 7 is a cross sectional view of a jet exhaust duct taken on line 7—7 of FIG. 6;

FIG. 8 is a cross sectional view of a pair of over-under jet exhaust ducts with butterfly valve means to control the flow of exhaust;

FIG. 9A is a cross sectional view of a single omnidirectional controller to curtail the flow of jet exhaust into a pair of over-under jet exhaust ducts;

FIG. 9B is a cross sectional view taken on line 9B—9B of FIG. 9A;

FIG. 10 is a modified jet intake system for use with the saucer shaped vehicle of the present invention;

DETAILED DESCRIPTION OF THE PREFERRED EMBODIMENT

Figure 1:
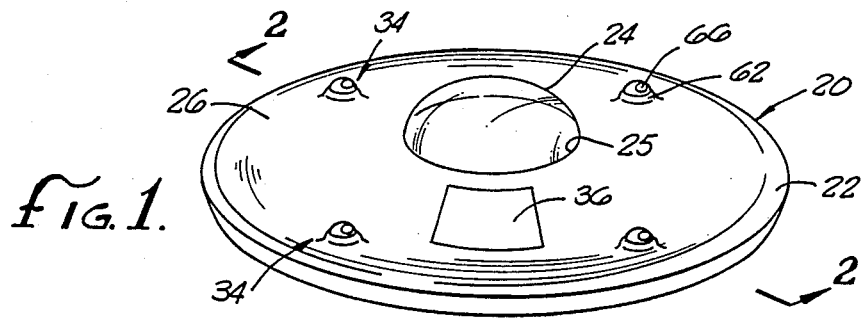
FIG. 1 is perspective view of a saucer shaped vehicle having jet directional nozzles for movement in a fluid medim.

REferring to FIG. 1 there is illustrated a vehicle generally designated 20 for movement through a fluid medium such as air. The vehicle 20 comprises a hollow, saucer-shaped body 22 at the top center of which is mounted a transparent dome-shaped canopy member 24 of any well known material which covers a cockpit area 25. Preferably the saucer-shaped body includes an upper convex surface 26 and a lower or under convex surface 28, see FIG. 2. The surfaces 26 and 28 terminate in an annular edge 30. The surfaces 26 and 28 may be aluminum or other metal skins that are secured to an interior frame not shown.

The saucer-shaped body 22 preferably contains a plurality of directional jet nozzle means designated 34. The nozzle means 34 preferably project from both the upper and lower convex surfaces. In addition, each pair of the directional jet nozzle means 34 are positioned one above the other, see FIGS. 2 and 3.

The vehicle 20 is equipped with a jet engine where the thrust to weight ratio includes a thrust capability that exceeds the weight of the vehicle, such as a lift jet engine schematically illustrated at 36 or at other appropriate area of the vehicle.

The present invention includes the concept of appropriate jet exhaust ducting means 38 that either emanate from the jet engine 36 and radiate outwardly toward the end 30 or the jet engine 36 discharges its exhausts into a plenum chamber designated 40, see FIG. 9A and 9B which have ducting means 42. If the latter is used then preferably there is a discharge duct 42 (FIG. 9A) from the engine (not shown) to the plenum chamber 40.

Also the present invention includes the concept and details of a single control or controller means designated 46 within the cockpit 25 of the vehicle to control the angulation of the directional jet nozzle means 34 as well as the rate and volume of jet exhaust passing through each ducting means 38.

Figure 2:
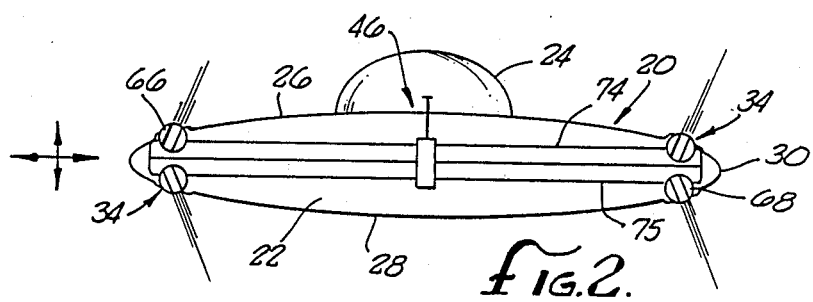
FIG. 2 is a side elevational view of the saucer shaped vehicle with a schematic control system for causing omnidirectional movement of said vehicle.
Figure 3:
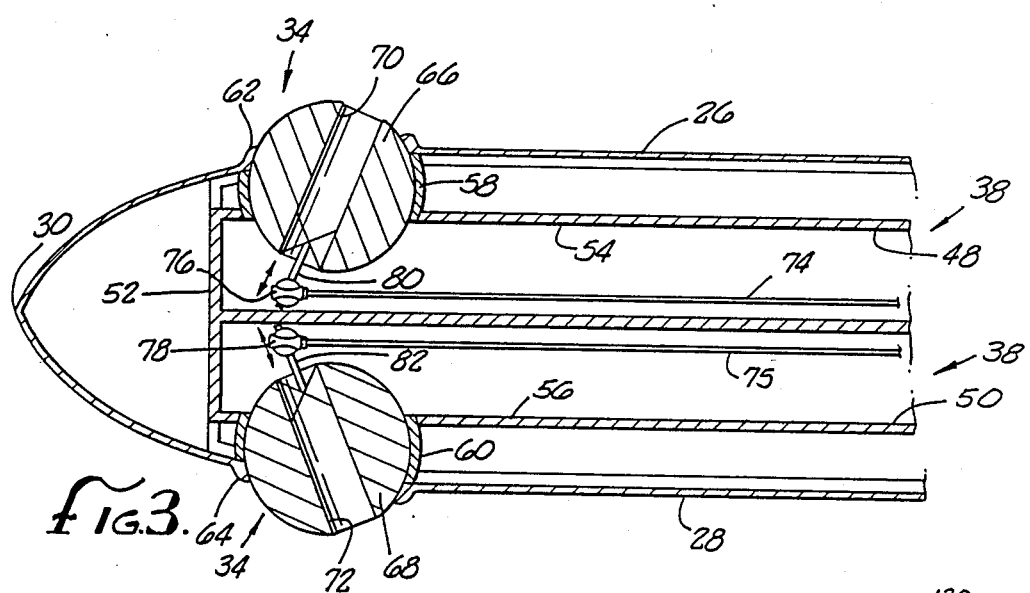
FIG. 3 is an enlarged jet nozzle directional means on a vehicle and the linkage means to move said means.

FIGS. 2 and 6 show in greater detail a preferred interconnection of the control or controller means 46 and directional jet nozzle means 34. FIG. 3 shows in detail nozzle means 34 and ducting means 38. Preferably there are conventional upper jet exhaust ducts 48 and lower exhaust ducts 50. The ducts 48 and 50 terminate in a common end wall 52. The outer walls 54 and 56 of ducts 48 and 50 are fitted with sockets 58 and 60 which extend outward forming exterior retainer rims 62 and 64.

Mounted within the retainer rims 62 and 64 are directional ball jet nozzles 66 and 68. Each ball jet nozzle is rotatably retained in a retainer rim 62 or 64 so they may each be rotated as desired by structure to be described. Each ball 66 and 68 includes a thrust vectoring control passage 70 and 72 extending diametrically through the balls 66 and 68 communicating with the ducts 48 and 50 and the atmosphere or fluid medium.

In order to rotate the ball jet nozzles 66 and 68 for directional movement of the vehicle 20 each duct 48 and 50 may contain connecting rods 74 and 75 extending from the single control means 46 to a ball and slide socket 76 and 78. Each ball and slide socket 76 and 78 includes a diametrical bore, not shown that receives a sliding connector link bar 80 and 82 which is affixed within the thrust vectoring passage 70 and 72 respectively.

In operation, as the connecting rods 74 and 75 are moved the ball and slide sockets 76 and 78 will be moved backwards forwards or to the side. This in turn will cause movement of the sliding connector link bars 80 and 82 moving the ball jet nozzles 66 and 68 changing the angles of the thrust vectoring passages 70 and 72. As the link bars 80 and 82 move they will slide in and out of the passages in the ball and sockets 76 and 78.

In FIG. 6 there is illustrated the connection to four directional jet nozzle means 34 spaced around the vehicle 20. The interior retainer rims 62 can be seen with the upper ball jet nozzles 66 mounted therein. The connecting rods 74 can also be seen passing through the upper ducts 48 illustrated in dashed lines in FIG. 6.

FIG. 6 also illustrates for clarity a pair of seats 84 in the cockpit 25. Between the seats is the single control means 46 which includes a handle 86 to control the omnidirectional movement of the nozzles 66 and 68. By activating the handle 86 the connecting rods 74 and 75 secured thereto will shift the nozzles 66 and 68.

On the FIG. 6 illustration a lift jet engine 36 is mounted behind the cockpit and the discharge duct 42, seen in dashed lines extends from the engine to the plenum chamber 40. Fuel tanks 88, seen in dashed lines, may be positioned within the vehicle 20.

In FIG. 9A and 9B there is illustrated in detail one form of the single control or controller means 46. FIGS. 9A and 9B are directed to the control of the volume of jet exhaust to be passed out the ducts 48 and 50 respectively. In connection with the stick 86 angular control of the jet nozzles 66 and 68 may be undertaken by any mechanical, electrical or pneumatic means. Detailed means will be subsequently discussed. The plenum chamber 40 is preferably annular and includes an annular housing 90 having a top wall 92 to close it off. Preferably spaced around the housing 90 are jet exhaust inlet openings 94 that are aligned with upper ducts 48. The ducts 48 and 50 may terminate in a manifold aligned with each other which is secured to the exterior of the housing 90 so that the upper openings 94 and lower opening 96 can align with the ducts 48 and 50.

Vertically slidably mounted within of the housing 90 is an internal annular valve drum 98. The drum includes jet exhaust inlet openings 100 which are aligned with the lower ducts 50. Also the drum 98 is provided with upper inlet openings 102 which are alignable with the upperducts 48. The drum 98 has a top wall 104 and the control handle 86 is affixed thereto. In operation the stick 86 or hand grip 106 may be pulled upwardly which in turn will move the drum 98 upward in the housing. In view of the positioning of the upper and lower openings 100 and 102 an upward move will open all or part of the lower ducts 50 and close part or open all of the upper ducts 48 depending on how far the drum 98 is moved upwardly or downwardly. If the drum 98 is raised to the fullest, full jet exhaust may pass out the lower set of ducts. On the other hand a half way lift exposes both sets of ducts 48 and 50 which would be necessary for horizontal flight as exhaust enters the both directional nozzles 34.

Figure 4:
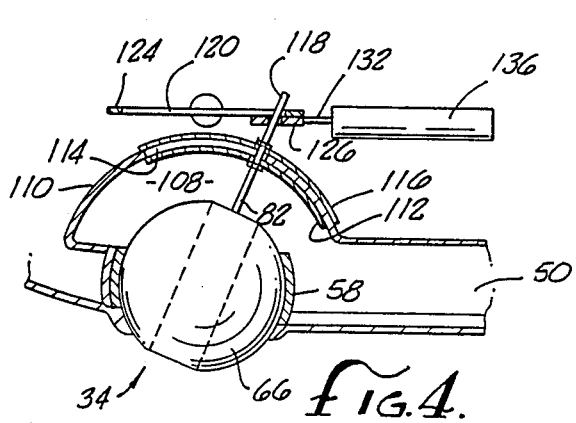
FIG. 4 is a side elevational cross-sectional modified connection means between a jet nozzle directional means and linkage means.
Figure 5:
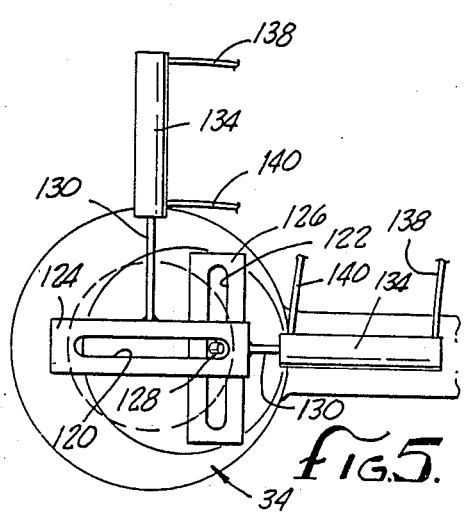
FIG. 5 is a top view of the connection means of FIG. 4.

One means to angle the nozzles 66 and 68 is illustrated in FIGS. 4 and 5. The controls for such angulation may be mounted on the handle grip 106. In FIGS. 4 and 5 there is illustrated a single exhaust duct 50 with the duct terminating in an enlarged dome shaped chamber 108 defined by dome wall 110 and the socket 58. The ball jet nozzle 66 with the thrust vectoring passage is mounted in the socket 58. The slide connector link bar 82 is fixedly secured to a dome shaped inner plate 112. The plate 112 is contoured to the dome wall 110 and underlies as circular opening 114 in the dome. On the exterior of the dome wall 110 there is an exterior dome plate 116 which is interconnected with the interior plate 112 for simultaneous movement. Projecting upward from the plate 116 is an extension 118 of sliding connector link bar 82.

The extension 118 is slidably interfitted in slots 120 and 122, see FIG. 5 of slide bars 124 and 126. As can be seen the bar 124 overlaps bar 126 forming a restricted opening 128 for the extension 118. In order to move the slide bar 124 and bar 126 with respect to each other each may be connected to a piston rod 130 and 132 projecting from a hydraulic or pneumatic pistons in housings 134 and 136 respectively. Appropriate activation-deactivation lines 138 and 140 may be employed.

In operation when it is desired to rotate the nozzle 66 either or both pistons in housing 134 and 136 are activated such as by control buttons 142. See FIG. 9A. In moving the aligned plates they will move over the opening 114 in the dome so that there is angulation of the nozzles as desired within the limits of opening 114.

While only one jet exhaust means 34 is illustrated in FIGS. 4 and 5, the arrangement of over-under means 34 as in FIG. 3 may be used with equal effect.

Thus, if the single control means 46 of FIG. 9A is used and the vehicle 20 is an aircraft, a vertical takeoff may be effected as follows.

After the jet engine 36 is activated the valve drum 98 is vertically elevated through stick 86 so that jet exhaust only passes into the lower ducts 50 to jet nozzles 68. Also the control buttons 142 are engaged so that the thrust vectoring passages 72 are vertical. As the engine is accelerated and jet exhaust passes out the passages the vehicle 20 will lift as a VTOL aircraft.

When a desired height is achieved the nozzles 66 may be rotated to any angle for horizontal flight. With the omnidirection available to each nozzle or Vector In Forward Flight (VIFFing) the vehicle 20 may turn to the right or left or rotate for directional movement. When it is desired to maintain steady flight both the upper and lower nozzles 66 and 68 may be activated, and of course for descending the exhaust to the lower nozzles 68 may be curtailed or lessened with more thrust from the upper nozzle.

In FIG. 10 there is a vehicle 20' as described before but a configuration of the high by-pass ratio fan jet engine 36' differs where the peripheral air intake 144 is provided to allow air to enter through the upper convex surface to the engine 36'. In this embodiment there are ducts 50' to the jet nozzle means 34' and then the residue of the engine exhaust not needed may be discharged out through appropriate openings in the lower convex surface, see arrows.

In FIG. 8 there are alternative valve means 146 which may employ butterfly valves 148 and 150. These valves may be controlled by motor or solenoid means 152 and 154 activated by the pilot of the vehicle 20.

Figure 12:
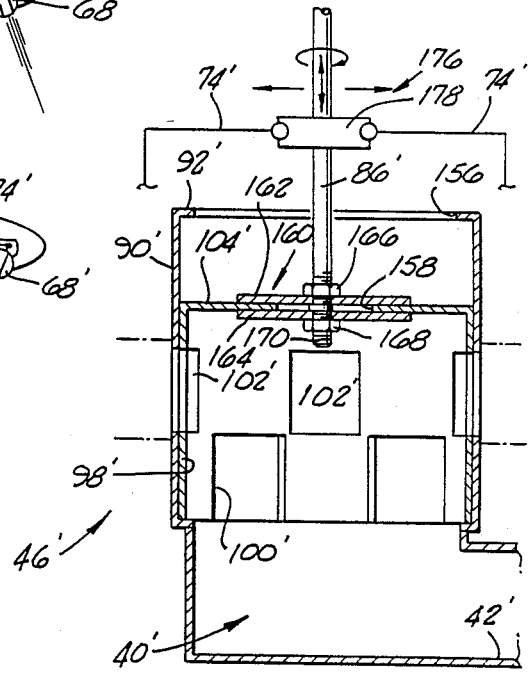
FIG. 12 is a side elevational sectional view of a single controller means to move said jet nozzles and to control the flow of exhaust to said nozzles.

FIG. 12 illustrates a single control or controller means 46'. As before described for the means in FIG. 9A there is a discharge duct 42' from the engine which communicates with a plenum chamber 40'. The chamber 40' is defined by the outer annular housing 90'. The top wall 92' does not extend over the entire area, but a relatively large opening 156 is formed therein. Mounted within the housing 90' is annular valve drum 98' having top wall 104' with a relatively large annular opening 158 extending therethrough. The drum 98' and housing 90' have jet exhaust passages 94', 96' 100' and 102' as previous described.

The difference between the control means 46 and 46' resides in the structure for causing angulation of the jet nozzles 66 and 68.

A slide coupling means designated 160 is fitted to the drum 98', which means 160 is secured to the handle or control stick 86'. The slide coupling means 160 includes a pair of annular plates 162 and 164 which are mounted on each side of the top wall 104' overlying the opening 158. The plates 162 and 164 are maintained for simulataneous movement by nuts 166 and 168 that are secured on a thread end 170 of the stick 86'. Appropriate lubrication, such as air film lubrication, is applied to the plates 162 and 164 and wall 104' so that there may be omnidirectional horizontal movement of the plates 162 and 164 which reduce frictional drag. With the openings 156 and 158 it can be seen that the only curtailment of the horizontal movement of the stick 86' is the outer annular opening dimensions.

In order to adjust the direction of the ball jet nozzles 66' or 68' the connecting rods 74' that connect to the nozzles 66' or 68' can move inward to the cockpit area and by appropriate linkage means (not shown) move upward to a rod sycronization wheel 178 where they are each connected to the wheel 178.

Figure 11A:
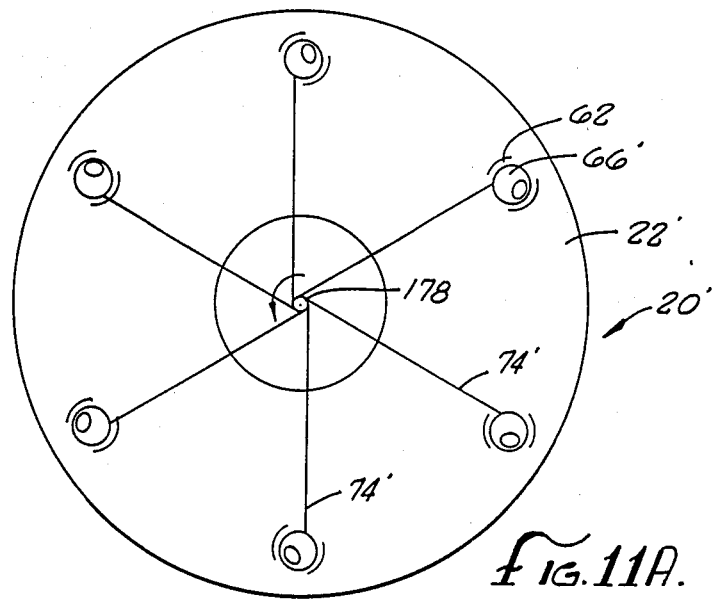
FIG. 11A is a schematic representation of a single control means which is linked to a plurality of jet nozzles and by rotation of said control means rotates said nozzles for directional movement of said vehicle.
Figure 11B:
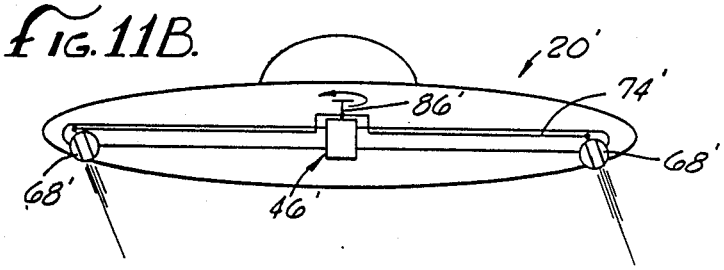
FIGS. 11B and 11C are side elevational views of a saucer shaped vehicle and the jet nozzle controller means shifting the nozzles.
Figure 11C:
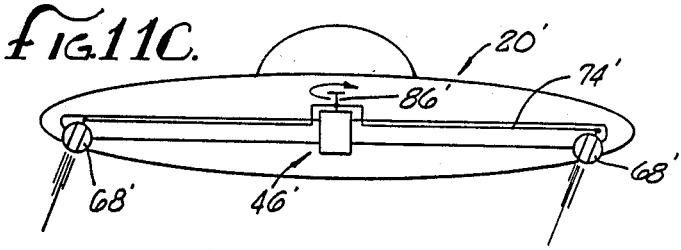

As can be seen in FIG. 11a the rods 74' are preferably connected to chord sections of the wheel 178. Thus with a rotation of the stick 86' each of the connecting rods '74 are pulled or pushed so that each jet nozzle 66' or 68' will be rotated in the same direction for movement of the vehicle 20'. FIGS. 11B and 11C illustrate two opposed positions for the nozzles 68' dependent upon whether the vehicle 20' is to proceed forward or rearward.

As can be seen in FIG. 12 the stick 86' may be rotated clockwise or counterclockwise in order to simultaneously rotate the nozzles 66' or 68'. In addition the stick 86' may be moved backwards or forward, see arrows in FIG. 12, to further adjust the direction of the nozzles. In this way the nozzles are capable of omnidirectional movement to propel the vehicle 20 in any direction. While not shown, a geared twist grip throttle may be combined with control stick 86' to modulate thrust to said jet nozzles 34.

In addition, as previously described housing 90' and sliding drum 98' may be moved upward or downward by stick 86' to control the volume of jet exhaust desired to be passed into the ducts 48 or 50.

Thus, it can be seen that with the omnidirectional capability of the vehicle 20' the same is capable of vertical take off and landing as well as any other directional movement.

Further, while the thrust of the specification has been directed to aircraft the same control and directional principle may be employed by hover craft or other vehicles without departing from the spirit of the invention. Also, mechanical linkage has been discussed as the preferred way in which to impart the single control means 46 command to the nozzles 66 and/or 68; however, pneumatic, hydraulic or electro magnetic means may be used with equal force and effect.

The invention and its attendant advantages will be understood from the foregoing description and it will be apparent that various changes may be made in the form, construction and arrangements of the parts without departing from the spirit and scope thereof or sacrificing its material advantages, the arrangements hereinbefore described being merely by way of example. I do not wish to be restricted to the specific forms shown or uses mentioned, except as defined in the accompanying claims wherein various portions have been separated for clarity of reading and not for emphasis.

I claim:

1. In a vehicle capable of omnidirectional movement wherein said vehicle has an upper and lower surface and includes a vehicle control center, a jet engine power source, directional jet nozzle means on said vehicle communicating with said jet engine to receive jet exhaust from said engine, a single control means in said vehicle control center to control vectoring of said vehicle, the improvement including:

each of said directional jet nozzle means mounted in at least one of said surfaces and a thrust vectoring passage included therein to channel said jet exhaust to the exterior of said vehicle to impart desired directional movement to said vehicle;

said single control means including a plenum chamber communicating with said jet engine to receive jet exhaust therefrom, an outer housing forming said plenum chamber, said housing including exhaust openings, a drum slidably mounted within said housing, said drum including exhaust openings alignable with said openings in said housing to control the discharge of jet exhaust from said plenum chamber, a handle means affixed to said drum and passing through said housing whereby upward or downward movement of said handle means will slidably move said drum within said housing to align and misalign said openings, and jet nozzle directional adjustment means mounted on said handle means leading to said directional jet nozzles whereby movement of said adjustment means will cause simultaneous rotation of said jet nozzles to impart directional movement to said vehicle; and ducting interposed between said housing and said directional jet nozzle means to convey said jet exhaust and said ducting enclosing a portion of said nozzle means.

2. In a vehicle as defined in claim 1 wherein said directional jet nozzle means includes:

a socket in at least one surface of said vehicle, a ball jet nozzle rotatably mounted in said socket having a portion projecting outwardly of said surface, said thrust vectoring passage extending diametrically through said ball jet nozzle whereby exhaust within said duct may be forced through said thrust vectoring passage for directional movement of said vehicle.

3. In a vehicle as defined in claim 2 wherein said jet nozzle directional adjustment means includes:

a sliding connector link bar fixed to said ball jet nozzle;

a shiftable rotation diverter means engaging said sliding connector link bar and controlling movement thereof;

coupling means to activate said shiftable rotation diverter means extending to said single control means whereby movement of said single control means will impart movement of said shiftable rotation diverter means to rotate said ball jet nozzle.

4. In a vehicle as defined in claim 3 wherein said shiftable rotation diverter means is a ball and slide socket with said sliding connector link bar slidably mounted therein; and said coupling means includes a connecting rod secured to said ball and slide socket and to said single control means.

5. In a vehicle as defined in claim 3 wherein said shiftable rotation diverter means includes:

a pair of slide bar plates having elongated axes, each having an elongated slot, one of said pairs overlaying the other with the slot positioned normal to the elongated axis of the under one of said pair;

activator pistons secured to said bars adapted to move each of said plates relative to each other;

said sliding connector link bar passing through an opening created by the overlapping of said slots of said bars, whereby movement of either of said slide bar plates will impart movement to said slide connector and cause rotation of said ball jet nozzle; and control means on said handle means to activate and deactivate said activator pistons.

6. In a vehicle as defined in claim 5 wherein said activator pistons are hydraulically activatable.

7. In a vehicle as defined in claim 5 wherein said activator pistons are electrically activatable.

8. In a vehicle as defined in claim 1 wherein said housing of said single control means includes a top wall with a relatively large opening therethrough;

said drum of said single control means includes a top wall with a relatively large opening therethrough and aligned with said opening of said housing top wall;

slide coupling means associated with said drum top wall and covering said relatively large opening in said drum wall; and a control stick having an elongated vertical axis connected to said slide coupling means and adapted for directional movement on and parallel to said axis.

9. In a vehicle as defined in claim 8 wherein said slide coupling means includes:

a pair of annular plates one mounted on said drum wall overlying said relatively large opening and the other of said pair below said drum wall bearing against said wall and aligned with the upper of said pair of plates; and tie means to retain said plates in alignment for sliding and rotational movement on said drum wall and to hold said control stick thereto.

10. A vertical take off and landing vehicle capable of omnidirectional movement when airborne comprising:

a saucer shaped body having upper and lower convex surfaces and an annular edge, said body also including a cockpit therein with a transparent canopy covering said cockpit;

a jet engine mounted within said body for propelling said body through the discharge of exhaust therefrom;

a plurality of pairs of non-stationary adjustable omni directional jet nozzle means mounted on and peripherally around said upper and lower surfaces one above the other adjacent the edge thereof, said nozzles adapted to receive and discharge the jet exhaust to effect movement of said body; and a single control means including a plenum chamber communicating with said jet engine to receive said exhaust and control the distribution of said exhaust to said jet nozzles, and jet nozzle directional adjustment means also mounted on said control means to omnidirectionally rotate said jet nozzles.

* * * * *